(12) United States Patent
Biertz et al.

(10) Patent No.: US 7,770,499 B2
(45) Date of Patent: Aug. 10, 2010

(54) WORKPIECE HOLDING SYSTEM FOR A MACHINE TOOL

(75) Inventors: Matthias Biertz, Neu Anapach (DE); Wolfgang Pieczeit, Dornburg (DE); Patrik Scalla, Bad Hornburg (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 404 days.

(21) Appl. No.: 11/730,440

(22) Filed: Apr. 2, 2007

(65) Prior Publication Data
US 2007/0227318 A1 Oct. 4, 2007

(30) Foreign Application Priority Data
Mar. 31, 2006 (DE) .................. 10 2006 015 432

(51) Int. Cl.
*B23B 5/34* (2006.01)
(52) U.S. Cl. ........................... 82/104; 82/150; 82/170
(58) Field of Classification Search ............ 82/104, 82/168, 169, 170, 150, 151; 157/16, 18
See application file for complete search history.

(56) References Cited

U.S. PATENT DOCUMENTS

| | | | | |
|---|---|---|---|---|
| 3,044,791 A | * | 7/1962 | Newhouser et al. | 279/106 |
| 3,462,162 A | * | 8/1969 | Stoeffler | 279/2.12 |
| 5,464,233 A | * | 11/1995 | Hanai | 279/137 |
| 5,820,137 A | * | 10/1998 | Patterson | 279/141 |
| 6,126,174 A | * | 10/2000 | Reece et al. | 279/2.24 |
| 6,502,834 B1 | * | 1/2003 | Fukui et al. | 279/2.04 |
| 6,513,241 B1 | | 2/2003 | Shalosky | |
| 6,687,967 B1 | | 2/2004 | Smith | |
| 7,185,573 B1 | * | 3/2007 | Gatton | 82/104 |
| 2003/0222388 A1 | | 12/2003 | Vander Wal | |
| 2004/0080087 A1 | | 4/2004 | Lin | |

FOREIGN PATENT DOCUMENTS

| | | |
|---|---|---|
| DE | 20 2004 014 939 U1 | 1/2005 |
| EP | 0 709 163 A2 | 5/1996 |
| WO | WO 2004078413 A1 * | 9/2004 |
| WO | WO 2006/003683 A1 | 1/2006 |

* cited by examiner

Primary Examiner—Boyer D Ashley
Assistant Examiner—Sara Addisu
(74) Attorney, Agent, or Firm—Timothy J. Kilma; Shuttleworth & Ingersoll, PLC

(57) ABSTRACT

A workpiece holding system for correctly locating disk-shaped workpieces in a work area of a machine tool, in particular for machining rotor disks of a gas turbine engine, includes a base plate (6) firmly attached to the machine tool (1) with vertically and radially adjustable clamping elements (7) for restraining the workpiece on an outer circumference in a correct position, as well as a plurality of differently dimensioned centering elements (12) and supporting elements (17), each adapted to a particular shape and size of the workpiece (2) to be machined and to the respective processing step, these centering (12) and supporting elements (17) being exchangeable and attachable to the base plate/machine tool by quick fasteners.

16 Claims, 2 Drawing Sheets

WORKPIECE HOLDING SYSTEM FOR A MACHINE TOOL

Figure 1:
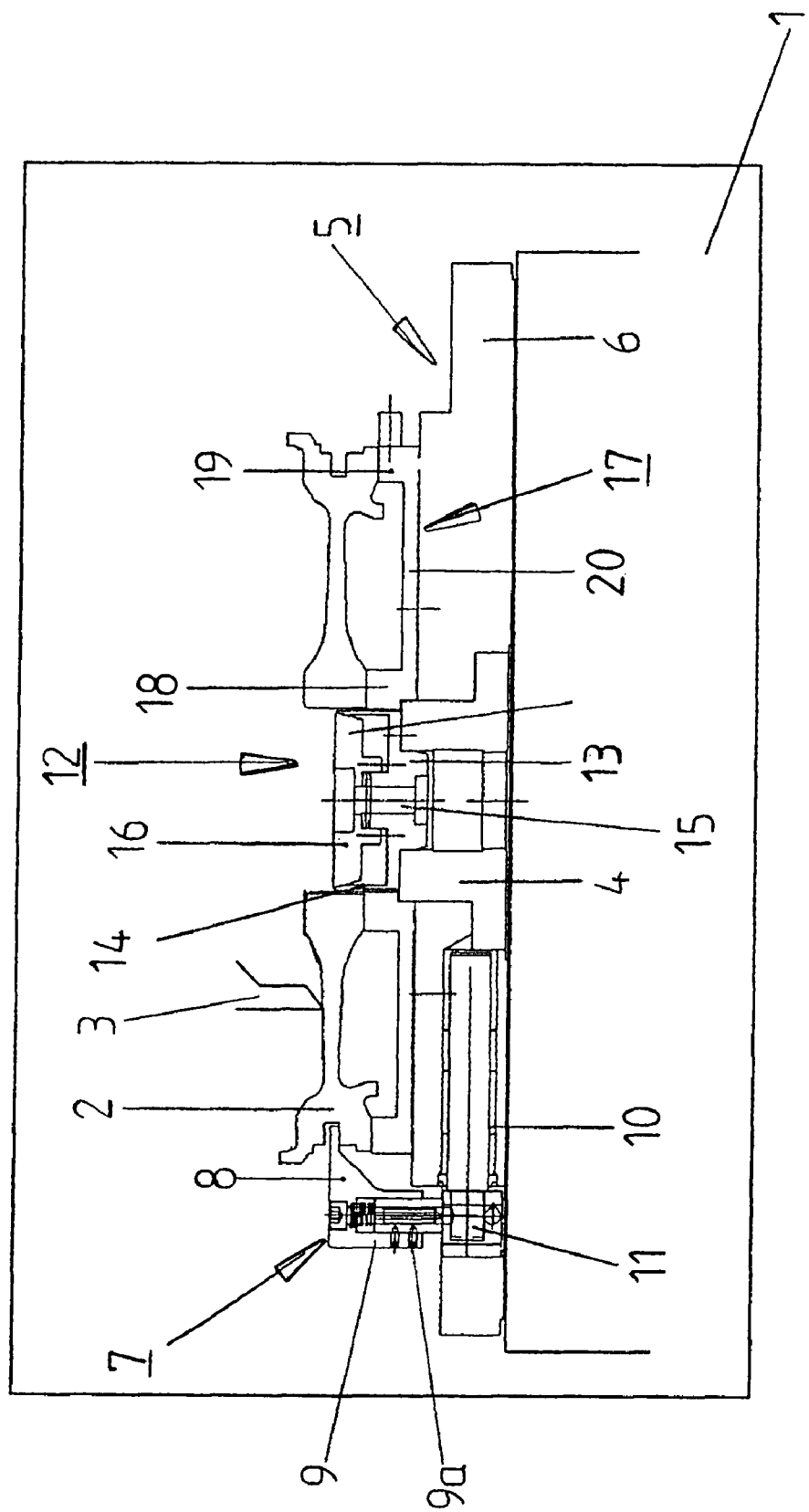

This application claims priority to German Patent Application DE10 2006 015 432.0 filed Mar. 31, 2006, the entirety of which is incorporated by reference herein.

This invention relates to a workpiece holding system for a machine tool for the positionally correct location of disk-shaped workpieces, in particular of rotor disks for a gas turbine engine, in the work area of the machine tool.

A multi-stage compressor of a gas turbine engine, for example, comprises several rotor disks, each with a stage-specific design, which are provided with a central bore passed by an engine shaft and, on the outer circumference, with a peripheral slot or a plurality of axial slots for fixing the compressor blades required in the respective stage. These diverse disk-shaped workpieces are held during the various cutting machining operations by a one-piece clamping and holding fixture which is specific to each of the various disks and each of the various machining operations to be performed on one and the same disk, i.e. by a workpiece clamping and holding fixture which is specific to the respective disk shape and processing step. The great variety of clamping and holding fixtures for the various disk sizes and machining operations accordingly incurs high cost and storage space demands. A further disadvantage is the high time requirement for changing over the heavy fixtures, as these can only be handled by means of a crane. During such time-intensive change-over operations, the respective machine tool is not available for machining. Finally, the maintenance and inspection effort for the great number of different holding fixtures is high.

In a broad aspect, the present invention provides a cost-effective holding fixture for disk-shaped workpieces of different form and size, which can be easily handled and requires only a low set-up, storage and inspection effort.

It is a particular object of the present invention to provide a solution to the above problems by a workpiece holding system designed in accordance with the features described herein. Advantageous developments and useful embodiments of the present invention will be apparent from the description below.

In other words, the present invention provides a base plate rigidly mounted in the machine tool and provided with radially and vertically adjustable clamping elements retaining the workpiece on the outer circumference. The workpiece holding arrangement further comprises several—differently dimensioned—centering and supporting elements. A centering and supporting element specific to the workpiece and to the respective machining operation is temporarily fixed to the base plate to locate and center the workpiece in the machine tool work area in the correct machining position. Subsequently, the workpiece is restrained between the clamping elements located on its outer circumference, thus being ready for positionally correct machining. For subsequent machining of the same or a differently sized workpiece, only the supporting element and the centering element need to be changed. Due its low weight and simple, temporary attachment, the centering and supporting element is changeable with low time and work investment and without any auxiliary equipment. The space requirement for storing the manually portable centering and supporting elements is low.

The centering and supporting elements are attached without threaded fasteners, e.g. by a bayonet coupling or by magnetic force, thus requiring only low time investment.

In a favorable development of the present invention, the supporting elements can be provided in a sandwich (layered) construction to further save weight. Manipulation can be facilitated by separably attached handles.

The invention is more fully described in the light of the accompanying drawing.

Figure 2:
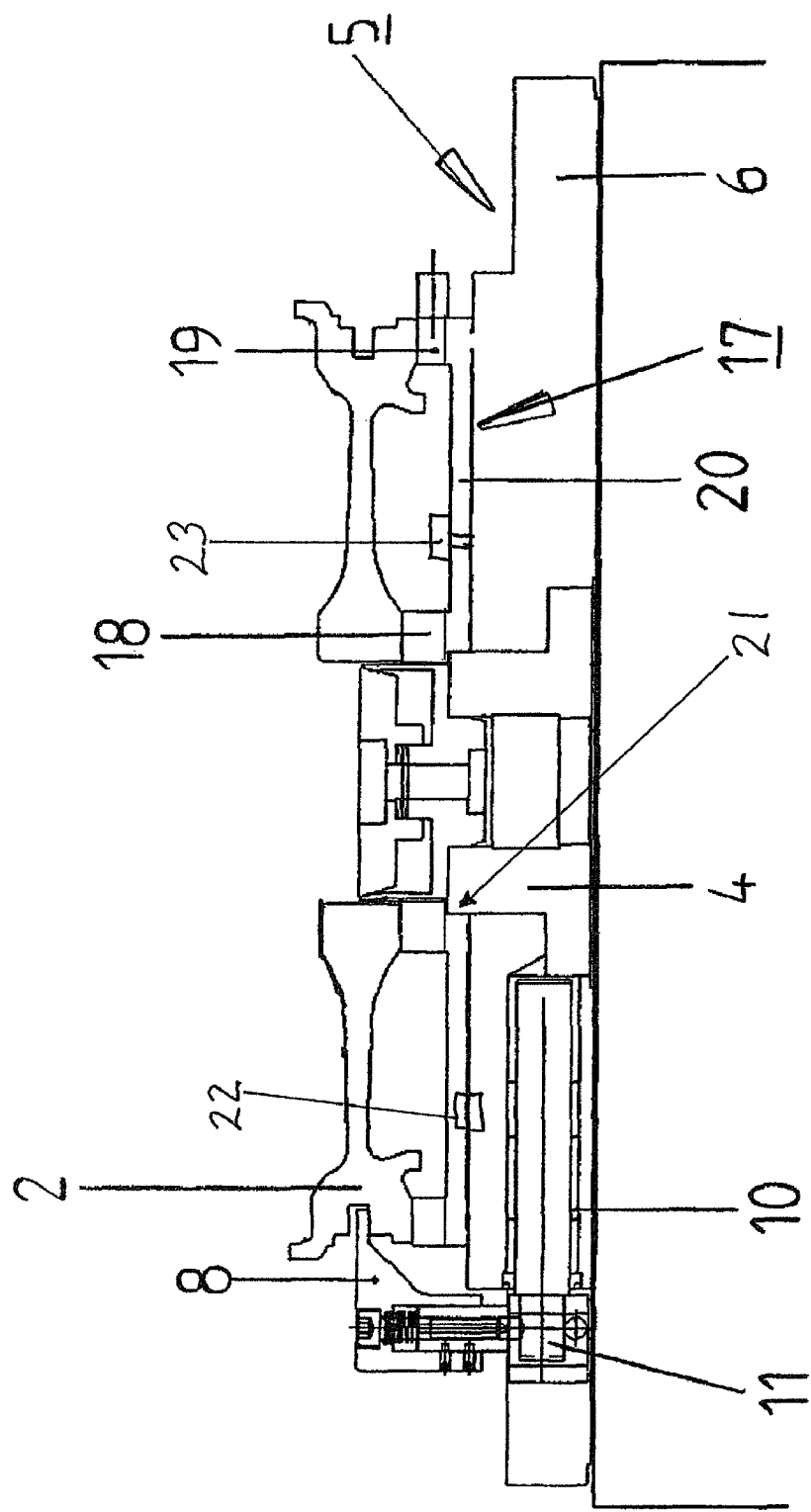

FIG. 1 shows, in a preferred embodiment, a lateral sectional view of a clamping fixture for a rotor disk of a compressor, which is integrated in a machine tool; and FIG. 2 shows, a partial lateral sectional view of the clamping fixture of FIG. 1.

A machine tool 1 for cutting machining of workpieces 2, in the present example, in the form of rotor disks, by means of a tool 3, is provided with a locating flange 4 to which a clamping fixture 5 is attached. The clamping fixture 5 comprises a base plate 6, which is circular in top view, on which radially and vertically adjustable clamping elements 7 are equally spaced on a circle. Clamping jaws 8 of the clamping elements 7 are guided on a vertical track 9 arranged normal to the base plate 6 and are lockable on this track 9 at a specified level by locking bolts 9a. The vertical track 9 is connected to a horizontal guide rail 11, this guide rail 11 being slideable in a channel 10 provided in the base plate 6. The horizontal guide rail 11 is also lockable in the desired position.

Besides the above mentioned clamping fixture 5, the workpiece holding fixture further comprises a centering element 12 whose height and outer diameter are dimensioned specifically to the workpiece to be machined and which is separably attached to the locating flange 4. The centering element 12 comprises a centering cylinder 14 emerging from a base 13 whose open end mates with a tapered clamping plate 16 secured to the base 13 by clamping bolt 15. As the clamping bolt 15 is tightened, the clamping plate taper will be drawn into the centering cylinder 14, thus forcing the thin wall of the centering cylinder 14 outwards and widening the centering cylinder 14 such that the cylinder wall will intimately contact the inner circumferential surface of the workpiece, thereby positioning the latter exactly centrically in the work area of the machine tool.

The workpiece holding system further comprises several supporting elements 17—dimensioned specifically to the respective workpiece 2 to be machined including an inner support ring 18 and an outer support ring 19 connected by braces 20. The thickness and the diameter of the support rings 18 and 19 are adapted to the shape of the respective workpiece 2 (rotor disk) to be machined. The respective supporting element 17 in the present embodiment is fixed by headed pins 23 (see FIG. 2) provided on the base plate 6 which engage keyhole-style openings (not shown) in the braces 20.

However, the supporting element can also be fixed by magnets 22, bayonet coupling 21 or other positive means. See FIG. 2. Handles (not shown) separably attached to the supporting element 17 facilitate manipulation during assembly and disassembly.

The base plate 6 with the adjustable clamping elements 7 will be rigidly mounted in the machine tool 1, independently of the size of the workpiece 2 to be machined. For machining a rotor disk, as exemplified in the drawing, the respective centering element 12 and the appertaining supporting element 17 will, in this sequence, be placed on and fixed to the locating flange 4 or the base plate 6, respectively. A centering element or supporting element, respectively, will be fitted whose shape and dimensions are adapted such to the workpiece 2, that the workpiece subsequently placed on the supporting element 17 will be positioned centrically in the machine tool at a height that agrees with the tool. Then, the centering element 12 will be restrained on the inner circumference of the workpiece 2 by tightening the clamping bolt 15, thus widening the centering cylinder 14 and fixing the workpiece 2 exactly in centric position. Finally, the workpiece is also restrained on the outer circumference by the radially and vertically adjustable clamping jaws 8 which here engage a peripheral slot on the outer circumference. For any further machining operation or the machining of a differently dimensioned workpiece, only the supporting element 17 and the centering element 12 need to be replaced to establish the correct position of the workpiece within the work area of the machine tool.

| List of reference numerals | |
|---|---|
| 1 | Machine tool |
| 2 | Workpiece/rotor disk |
| 3 | Tool |
| 4 | Locating flange |
| 5 | Clamping fixture |
| 6 | Base plate |
| 7 | Clamping element |
| 8 | Clamping jaw |
| 9 | Vertical track |
| 9a | Locking bolts |
| 10 | Channel |
| 11 | Horizontal guide rail |
| 12 | Centering element |
| 13 | Base |
| 14 | Centering cylinder |
| 15 | Clamping bolt |
| 16 | Clamping plate |
| 17 | Supporting element |
| 18 | Inner support ring |
| 19 | Outer support ring |
| 20 | Brace |

What is claimed is:

1. A workpiece holding system for a machine tool for correctly locating a disk-shaped workpiece in a work area of the machine tool, comprising a base plate rigidly mounted on a locating surface of the machine tool, the base plate including radially and vertically adjustable clamping elements for restraining the workpiece on its outer circumference, a plurality of exchangeable centering elements separably attachable to at least one of the base plate and the locating surface of the machine tool for centering the workpiece on its inner circumferential surface, each of the exchangeable centering elements being configured in a different manner to make it unique to at least one of a specific workpiece and a specific machining operation, and a plurality of exchangeable supporting elements separably attachable to the base plate, one at a time, a first one of the exchangeable supporting elements having an outward facing surface configured with a specific shape and surrounding an axis of the base plate as to be engageable with a first workpiece at multiple points surrounding the axis of the base plate to rigidly support the first workpiece in a desired position, when restrained by clamping elements, for a machining operation, each other supporting element configured differently from the first one of the supporting elements to at least one of rigidly support the first workpiece at multiple points surrounding the axis of the base plate for another machining operation and rigidly support another workpiece at multiple points surrounding the axis of the base plate for a machining operation, each supporting element being configured in a different manner to make it unique to at least one of a specific workpiece and a specific machining operation, wherein a plurality of differently configured workpieces can be correctly located and clamped in the workpiece holding system for machining by the machine tool by selecting specific one of the plurality of exchangeable centering elements and a specific one of the plurality of supporting elements to accurately fit a size and shape configuration of a selected one of the plurality of differently configured workpieces so as to correctly locate the selected workpiece on the machine tool, and others of the plurality of differently configured workpieces can be correctly located and clamped in the workpiece holding system for machining by the machine tool by merely exchanging at least one of the previously selected exchangeable centering element and exchangeable supporting element for another of the plurality of exchangeable centering elements and supporting elements constructed and arranged to accurately fit a size and shape configuration of one of the others of the plurality of differently configured workpieces.

2. A workpiece holding system in accordance with claim 1, wherein the clamping elements are arranged on the base plate at a certain distance from one another, which clamping elements comprise vertically adjustable and lockable clamping jaws, and vertical tracks on which the clamping jaws can be vertically adjusted, and lockable horizontal guide rails provided in the base plate to which the vertical tracks can be horizontally adjusted.

3. A workpiece holding system in accordance with claim 2, wherein a respective exchangeable centering element comprises: a base, a centering cylinder projecting from the base and having an open end, a tapered clamping plate for mating with the open end of the centering cylinder and enlarging a diameter of the centering cylinder depending on how deep the tapered clamping plate is positioned in the open end of the centering cylinder, and a clamping bolt for clamping the tapered clamping plate to the base and adjusting a depth to which the tapered clamping plate is positioned in the open end of the centering cylinder.

4. A workpiece holding system in accordance with claim 3, wherein a respective exchangeable supporting element comprises: two support rings of different diameters, and braces connecting the two support rings, the thickness and size of the support rings being adapted to the selected workpiece and a respective processing operation.

5. A workpiece holding system in accordance with claim 4, and further comprising at least one quick acting, non-threaded positive fixation device for quick attachment of at least one of the exchangeable supporting element and centering element to the base plate/locating surface.

6. A workpiece holding system in accordance with claim 5, wherein the positive fixation device is one of a bayonet-type joint and headed pins on one component that engage keyhole-style openings on a mating component.

7. A workpiece holding system in accordance with claim 5, wherein the positive fixation device includes a magnetic fixation device.

8. A workpiece holding system in accordance with claim 1, wherein the exchangeable supporting elements have a sandwich construction to save weight.

9. A workpiece holding system in accordance with claim 1, wherein a respective exchangeable centering element comprises: a base, a centering cylinder projecting from the base and having an open end, a tapered clamping plate for mating with the open end of the centering cylinder and enlarging a diameter of the centering cylinder depending on how deep the tapered clamping plate is positioned in the open end of the centering cylinder, and a clamping bolt for clamping the tapered clamping plate to the base and adjusting a depth to which the tapered clamping plate is positioned in the open end of the centering cylinder.

10. A workpiece holding system in accordance with claim 1, wherein a respective exchangeable supporting element comprises: two support rings of different diameters, and braces connecting the two support rings, the thickness and size of the support rings being adapted to the selected workpiece and a respective processing operation.

11. A workpiece holding system in accordance with claim 10, and further comprising at least one quick acting, non-threaded positive fixation device for quick attachment of at least one of the exchangeable supporting element and centering element to the base plate/locating surface.

12. A workpiece holding system in accordance with claim 11, wherein the positive fixation device is one of a bayonet-type joint and headed pins on one component that engage keyhole-style openings on a mating component.

13. A workpiece holding system in accordance with claim 11, wherein the positive fixation device includes a magnetic fixation device.

14. A workpiece holding system in accordance with claim 1, and further comprising at least one quick acting, non-threaded positive fixation device for quick attachment of at least one of the exchangeable supporting element and centering element to the base plate/locating surface.

15. A workpiece holding system in accordance with claim 14, wherein the positive fixation device is one of a bayonet-type joint and headed pins on one component that engage keyhole-style openings on a mating component.

16. A workpiece holding system in accordance with claim 14, wherein the positive fixation device includes a magnetic fixation device.

\* \* \* \* \*